US009666064B2

(12) United States Patent
Ishizawa et al.

(10) Patent No.: US 9,666,064 B2
(45) Date of Patent: May 30, 2017

(54) INFORMATION PROCESSING SYSTEM, INFORMATION PROCESSING METHOD AND STORAGE MEDIUM

(71) Applicant: NEC Corporation, Minato-ku, Tokyo (JP)

(72) Inventors: Yoshio Ishizawa, Tokyo (JP); Satoshi Nakazawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 66 days.

(21) Appl. No.: 14/782,373

(22) PCT Filed: Apr. 15, 2014

(86) PCT No.: PCT/JP2014/002126
§ 371 (c)(1),
(2) Date: Oct. 5, 2015

(87) PCT Pub. No.: WO2014/174796
PCT Pub. Date: Oct. 30, 2014

(65) Prior Publication Data
US 2016/0063852 A1 Mar. 3, 2016

(30) Foreign Application Priority Data
Apr. 23, 2013 (JP) .................................. 2013-090534

(51) Int. Cl.
*G08B 31/00* (2006.01)
*G06Q 10/06* (2012.01)
(Continued)

(52) U.S. Cl.
CPC ......... *G08B 31/00* (2013.01); *G06K 9/00771* (2013.01); *G06Q 10/06* (2013.01); *G08B 21/02* (2013.01)

(58) Field of Classification Search
CPC ........ G08B 21/22; G08B 25/14; B60R 25/04; G07C 9/00087; B01J 19/127;
(Continued)

(56) References Cited

U.S. PATENT DOCUMENTS 5,666,157 A * 9/1997 Aviv ................ G08B 13/19602
348/150
7,595,815 B2 * 9/2009 Donovan .................. H04N 7/18
340/506
(Continued)

FOREIGN PATENT DOCUMENTS

JP 2009-539182 A 11/2009
JP 2012-208793 A 10/2012
JP 2013-003929 A 1/2013

OTHER PUBLICATIONS

Singaporean Office Action for SG Application No. 11201508713W dated May 26, 2016.
(Continued)

*Primary Examiner* — George Bugg
*Assistant Examiner* — Munear Akki

(57) ABSTRACT

To support work of an operator of a monitoring system to set a monitoring rule depending on an environment to be monitored. An information processing system includes an environment expression extracting unit which extracts environment expressions from incident information expressing a certain incident, which includes the environment expressions expressing environments to be monitored and action expressions expressing actions performed in the environments; an action expression extracting unit which extracts the action expressions from the incident information; and an information collecting unit which generates information in which the extracted action expressions are associated with the environment expressions expressing the environments when the actions expressed by the action expressions have
(Continued)

been performed among the extracted environment expressions, conducts a search with respect to the generated information, with the action expressions as a key, and calculates, on the basis of the search, frequency at which the environment expressions have been extracted.

18 Claims, 15 Drawing Sheets

(51) Int. Cl.
*G06K 9/00* (2006.01)
*G08B 21/02* (2006.01)

(58) Field of Classification Search
CPC ...... A63B 21/00043; G06T 2201/0051; G06T 2207/10016; G06T 7/0081; G06K 9/66; G06K 9/00664; H04N 7/00; H04N 7/181; H04N 5/32; H04N 7/188; H04N 5/85; E21B 47/0002; G07F 19/207
USPC ............ 340/573.1, 506, 5.1, 5.53; 386/261; 348/143, E07.085, 162, 152, 150; 382/100, 103, 107, 155, 173, 224
See application file for complete search history.

(56) References Cited

U.S. PATENT DOCUMENTS

| | | | | |
|---|---|---|---|---|
| 8,131,012 | B2* | 3/2012 | Eaton | G06K 9/00771 340/573.1 |
| 8,605,941 | B2* | 12/2013 | Clarkson | G06F 3/017 382/103 |
| 2008/0303902 | A1* | 12/2008 | Romer | G07F 19/207 348/143 |
| 2013/0278501 | A1* | 10/2013 | Bulzacki | G06F 3/017 345/157 |
| 2013/0307766 | A1* | 11/2013 | Amathnadu | G06F 3/017 345/156 |

OTHER PUBLICATIONS

International Search Report for PCT Application No. PCT/JP2014/002126, mailed on Jul. 22, 2014.
English translation of Written opinion for PCT Application No. PCT/JP2014/002126.
Detecting Abandoned Luggage Items in a Public Space Kevin Smith, Pedro Quelhas, and Daniel Gatica-Perez Proceedings of the 9th IEEE International Workshop on Performance Evaluation in Tracking and Surveillance (PETS '06), Jun. 2006, 75-82.

* cited by examiner

Fig. 2

| ACTION EXPRESSION | FREQUENCY OF EXTRACTION (NUMBER OF TIMES) | ENVIRONMENT EXPRESSION | FREQUENCY OF EXTRACTION (NUMBER OF TIMES) |
|---|---|---|---|
| A MAN IN A CAR TAKES A PHOTOGRAPH | 10 | ABOUT 10 A.M. | 1 |
| | | IN THE EVENING | 9 |
| | | AT AN INTERSECTION IN 2-CHOME | 9 |
| | | IN THE TOKYO METROPOLITAN AREA | 1 |
| A MAN HOLDS A KNIFE | 14 | EARLY MORNING | 1 |
| | | 9 A.M. | 2 |
| | | AT AN AIRPORT | 8 |
| | | ON A STREET | 6 |

Fig. 8

| ACTION EXPRESSION | FREQUENCY OF EXTRACTION (NUMBER OF TIMES) | ENVIRONMENT EXPRESSION | FREQUENCY OF EXTRACTION (NUMBER OF TIMES) |
|---|---|---|---|
| A MAN IN A CAR TAKES A PHOTOGRAPH | 10 | IN THE EVENING | 9 |
|  |  | AT AN INTERSECTION IN 2-CHOME | 9 |
| A MAN HOLDS A KNIFE | 14 | AT AN AIRPORT | 8 |
|  |  | ON A STREET | 6 |

Fig. 13

| ACTION EXPRESSION | FREQUENCY OF EXTRACTION (NUMBER OF TIMES) | TIME EXPRESSION | FREQUENCY OF EXTRACTION (NUMBER OF TIMES) | PLACE EXPRESSION | FREQUENCY OF EXTRACTION (NUMBER OF TIMES) |
|---|---|---|---|---|---|
| A MAN IN A CAR TAKES A PHOTOGRAPH | 10 | ABOUT 10 A.M. | 1 | AT AN INTERSECTION IN 2-CHOME | 9 |
| | | IN THE EVENING | 9 | IN THE TOKYO METROPOLITAN AREA | 1 |
| A MAN HOLDS A KNIFE | 14 | EARLY MORNING | 1 | AT AN AIRPORT | 8 |
| | | 9 A.M. | 2 | ON A STREET | 6 |

Fig. 14

| ACTION EXPRESSION | FREQUENCY OF EXTRACTION (NUMBER OF TIMES) | TIME EXPRESSION | FREQUENCY OF EXTRACTION (NUMBER OF TIMES) | PLACE EXPRESSION | FREQUENCY OF EXTRACTION (NUMBER OF TIMES) |
|---|---|---|---|---|---|
| A MAN IN A CAR TAKES A PHOTOGRAPH | 10 | IN THE EVENING | 9 | AT AN INTERSECTION IN 2-CHOME | 9 |
| A MAN HOLDS A KNIFE | 14 | | | AT AN AIRPORT | 8 |
| | | | | ON A STREET | 6 |

INFORMATION PROCESSING SYSTEM, INFORMATION PROCESSING METHOD AND STORAGE MEDIUM

This application is a National Stage Entry of PCT/JP2014/002126 filed on Apr. 15, 2014, which claims priority from Japanese Patent Application 2013-090534 filed on Apr. 23, 2013, the contents of all of which are incorporated herein by reference, in their entirety.

TECHNICAL FIELD

The present invention relates to an information processing system and the like.

BACKGROUND ART

A monitoring system is a system for the purpose of improving a security in a station, an airport, and the like. The monitoring system includes a sensor, such as a camera and a microphone. The monitoring system monitors an abnormal circumstance using output of the sensor and a monitoring rule. The monitoring rule is, for example, a conditional expression indicating that, when what value the output of the sensor becomes, an abnormal circumstance is determined to occur.

The monitoring rule is, for example, the conditional expression "if (an image of a person putting down his/her luggage is caught by a camera, and then, a person does not get close to the luggage in a certain period of time) then (issue a warning)". When a conditional clause of the foregoing monitoring rule is satisfied, an operator of a monitoring system understands that the abnormal circumstance "a bag was abandoned" occurs. NPL 1 discloses an example of a monitoring system for monitoring the state where a bag was abandoned in a public place.

PTL 1 discloses that an abnormal circumstance is detected in a plurality of different places. PTL 1 discloses that monitoring rules to be set are different from each other between the case of monitoring a store which performs merchandise management using a POS (Point Of Sale system) sensor and the case of monitoring a store which performs merchandise management using a RFID (Radio Frequency IDentification) tag.

PTL 2 discloses a system for determining whether or not a given situation is an abnormal circumstance using a machine learning technique. The system disclosed in PTL 2 receives input of learning data. The learning data is information in which information expressing a situation is associated with a label indicating whether or not the situation is an abnormal circumstance. The technique disclosed in PTL 2 determines whether or not the given situation is an abnormal circumstance using the machine learning technique, on the basis of the inputted learning data.

PTL 3 discloses a technique for automatically generating a monitoring rule, on the basis of a database in which data regarding an abnormal event is registered and a database in which data regarding a normal event is registered.

CITATION LIST

Non Patent Literature

NPL 1: Detecting Abandoned Luggage Items in a Public Space Kevin Smith, Pedro Quelhas, and Daniel Gatica-Perez Proceedings of the 9th IEEE International Workshop on Performance Evaluation in Tracking and Surveillance (PETS '06), June 2006, 75-82

Patent Literature

PTL 1: Japanese Translation of PCT International Application Publication No. JP-T-2009-539182
PTL 2: U.S. Pat. No. 8,131,012
PTL 3: Japanese Unexamined Patent Application Publication No. 2013-003929

SUMMARY OF INVENTION

Technical Problem

In the techniques disclosed in NPL 1 and PTL 1, an operator of a monitoring system needs to set a monitoring rule by hand. However, setting of a lot of monitoring rules by hand is work requiring many worker-hours for an operator of a monitoring system. In addition, setting of an appropriate monitoring rule is difficult work for an operator without expert knowledge about a monitoring system.

In order for the technique disclosed in PTL 2 to appropriately determine whether or not a given situation is an abnormal circumstance, input of a large amount of learning data is needed. In the technique disclosed in PTL 2, a person needs to generate a large amount of learning data by hand. Generating of a large amount of learning data by hand is troublesome work for an operator of a monitoring system.

The technique disclosed in PTL 3 cannot generate a monitoring rule depending on an environment to be monitored.

It is an object of the present invention to support work of an operator of a monitoring system to set a monitoring rule depending on an environment to be monitored.

Solution to Problem

A first aspect of the present invention is an information processing system including: an environment expression extracting unit which extracts environment expressions from incident information, which includes the environment expressions which are expressions expressing environments to be monitored and action expressions which are expressions expressing actions performed in the environments, and is information expressing a certain incident by the expressions; an action expression extracting unit which extracts the action expressions from the incident information; and an information collecting unit which generates information in which the extracted action expressions are associated with the environment expressions expressing the environments when the actions expressed by the action expressions have been performed among the extracted environment expressions, conducts a search with respect to the generated information, with the action expressions as a key, and calculates, on the basis of the search, frequency at which the environment expressions have been extracted.

A second aspect of the present invention is an information processing method by a computer, including: extracting environment expressions from incident information, which includes the environment expressions which are expressions expressing environments to be monitored and action expressions which are expressions expressing actions performed in the environments, and is information expressing a certain incident by the expressions; extracting the action expressions from the incident information; and generating information in which the extracted action expressions are associated with the environment expressions expressing the environments when the actions expressed by the action expressions have been performed among the extracted environment expressions, conducting a search with respect to the generated information, with the action expressions as a key, and calculating, on the basis of the search, frequency at which the environment expressions have been extracted.

A third aspect of the present invention is a program which makes a computer execute: processing of extracting environment expressions from incident information, which includes the environment expressions which are expressions expressing environments to be monitored and action expressions which are expressions expressing actions performed in the environments, and is information expressing a certain incident by the expressions; processing of extracting the action expressions from the incident information; and processing of generating information in which the extracted action expressions are associated with the environment expressions expressing the environments when the actions expressed by the action expressions have been performed among the extracted environment expressions, conducting a search with respect to the generated information, with the action expressions as a key, and calculating, on the basis of the search, frequency at which the environment expressions have been extracted.

The object of the present invention is achieved by a computer-readable storage medium storing the above-described program.

Advantageous Effects of Invention

According to the present invention, work of an operator of a monitoring system to set a monitoring rule depending on an environment to be monitored can be supported.

BRIEF DESCRIPTION OF DRAWINGS

FIG. 2 is a diagram illustrating an example of information which a first storing unit 210 in the first exemplary embodiment of the present invention stores.

FIG. 8 is an example of information which a second storing unit 220 in the second exemplary embodiment of the present invention stores.

FIG. 13 is a diagram illustrating an example of information which a first storing unit 210A in the fifth exemplary embodiment of the present invention stores.

FIG. 14 is a diagram illustrating an example of information which a second storing unit 220A in the fifth exemplary embodiment of the present invention stores.

DESCRIPTION OF EMBODIMENTS

Figure 1:
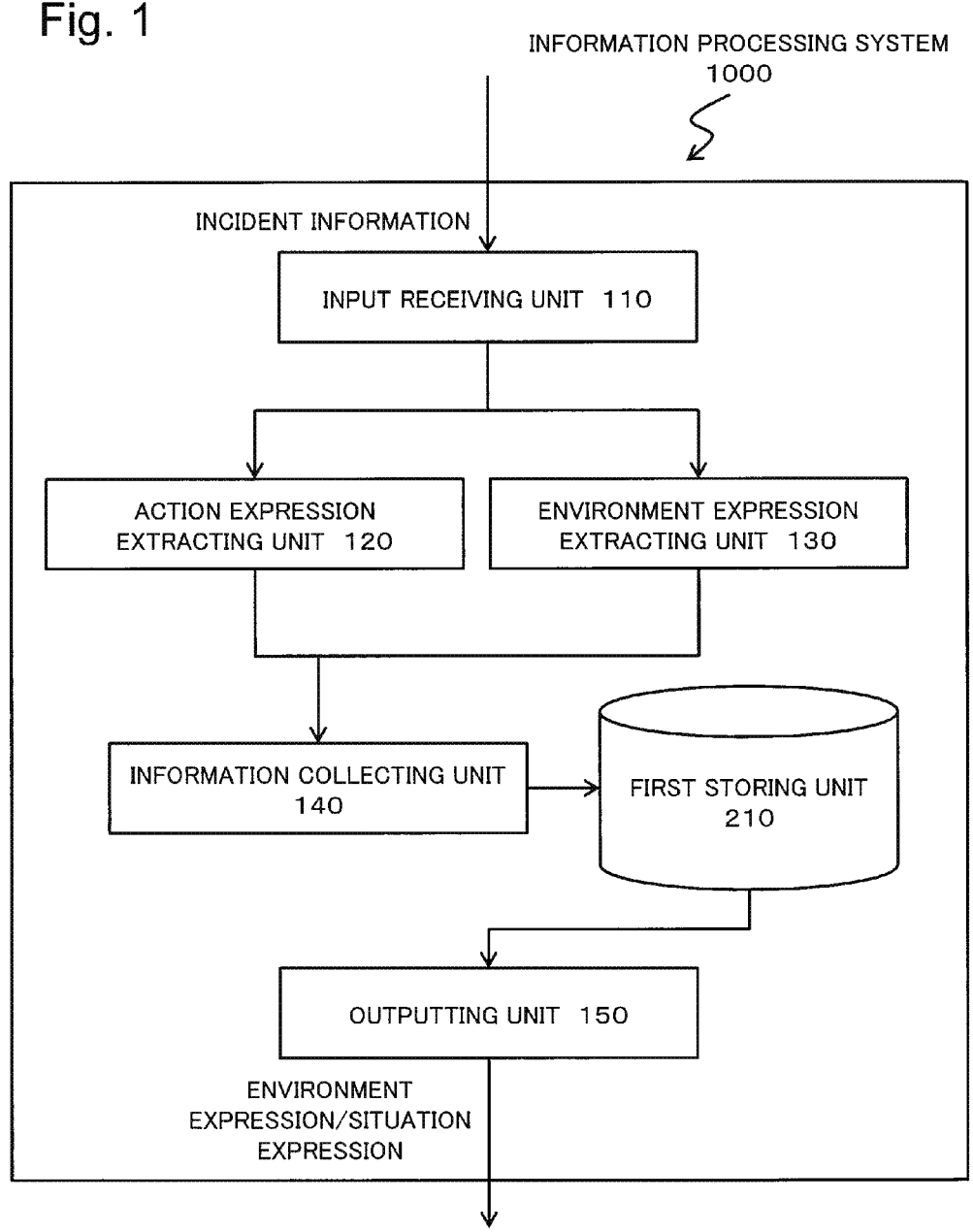
FIG. 1 is a block diagram illustrating a configuration of an information processing system 1000 in a first exemplary embodiment of the present invention.

Initially, problems to be solved by the present invention will be described in detail for the purpose of easy understanding of the invention.

A monitoring system monitors various environments. For example, the monitoring system monitors various places, such as "stadium", "airport", and "kitchen". When the monitoring system monitors a stadium, the monitoring system monitors various events, such as "soccer game" and "rock live". When the monitoring system monitors a stadium in which a soccer game is held, for example, the monitoring system monitors in various time periods, such as "morning", "before a game", "during a game", "after a game", and "night".

Hereinafter, the term "environment to be monitored" will be used in the sense of collectively expressing "place", "event", "time period", and the like which the monitoring system monitors. In addition, the term "environment expression" will be used in the sense of an expression expressing an environment to be monitored.

An operator of a monitoring system needs to set different monitoring rules depending on environments to be monitored. This is because, even when the monitoring system detects the same action, whether or not the monitoring system should issue a warning differs depending on the environments to be monitored. This will be described in detail using two specific examples.

The first specific example will be described. For example, the action "a man in a car takes a photograph" is not usually an abnormal circumstance in which a warning should be issued. However, the action "a man in a car takes a photograph" can be an abnormal circumstance in which a warning should be issued, depending on an environment to be monitored. For example, the case where the following incident has been frequently reported recently is assumed.

Content of Incident: A pupil was photographed by a suspicious-looking man in a car at an intersection in 2-chome toward evening.

In this case, the following monitoring rule is appropriate for preventing the incident. Monitoring Rule: "if (in the evening) and (at an intersection in 2-chome) and (a man in a car takes a photograph) then (issue a warning)". On the other hand, the following monitoring rule which does not limit the time period and the place is inappropriate because of too many false positive warnings. Monitoring Rule: "if (a man in a car takes a photograph) then (issue a warning)".

The second specific example will be described. When the environment to be monitored is an airport, for example, the following monitoring rule is appropriate. Monitoring Rule: "if (a person holds a knife) and (at an airport) then (issue a warning)". The action in which a person holds a knife at an airport is an abnormal action. When the conditional expression of the monitoring rule is satisfied at an airport, it is natural to understand that some sort of abnormal circumstance occurs.

However, when the environment to be monitored is a kitchen, for example, the following monitoring rule is not appropriate. Monitoring Rule: "if (a person holds a knife) and (in a kitchen) then (issue a warning)". This is because the action in which a person holds a knife in a kitchen is not an abnormal action, and the monitoring system needs not to issue a warning.

As described above, when the monitoring system detects the action "a man in a car takes a photograph" and the action "a person holds a knife", whether or not the monitoring system should issue a warning differs depending on the environments to be monitored.

In this manner, the operator cannot set an appropriate monitoring rule without knowledge about characteristics of an abnormal circumstance. In addition, the operator cannot set an appropriate monitoring rule depending on an environment to be monitored without knowledge about the environment to be monitored.

Hereinafter, exemplary embodiments of the present invention which can solve the foregoing problems will be described in detail with reference to drawings.

First Exemplary Embodiment

FIG. 1 is a block diagram illustrating a configuration of an information processing system 1000 according to a first exemplary embodiment. As illustrated in FIG. 1, the information processing system 1000 according to the first exemplary embodiment includes an input receiving unit 110, an action expression extracting unit 120, an environment expression extracting unit 130, an information collecting unit 140, an outputting unit 150, and a first storing unit 210. The information processing system 1000 is operated by an operator of a monitoring system, for example.

The input receiving unit 110 receives input of a plurality of pieces of incident information. The incident information is text information including action expressions and environment expressions. Hereinafter, the action expression, the environment expression, and the incident information will be described, respectively.

Hereinafter, the term "action expression" will be used in the sense of an expression expressing an action which a person or the like performs in an environment to be monitored. The action expression may be, for example, an expression relating to operations of a bicycle, a motorcycle, a car, and the like which a person drives, in an environment to be monitored. The action expression may be expressed by, for example, a co-occurrence expression, such as "a person holds something like a knife, and a person speaks loudly". In many cases, the action expression is a predicate expression in a text, or an expression modifying the predicate expression.

The environment expression is, for example, information expressing a place, an event, a time period, or the like which a monitoring system monitors. The environment expression is not limited to the place, the event, the time period, or the like. For example, expressions expressing situations, such as "on a low-traffic road", "in a situation where the number of people per unit area is n or more", and "in a situation where the temperature is 25° C. or more and the humidity is 80% or more", can be the environment expressions. The environment expression may include a human action. For example, expressions expressing situations, such as "in a situation where there is a woman with a bag", "in a situation where a silver car is parked", and "when a pupil looks both ways", can be the environment expressions.

The incident information includes the action expressions and the environment expressions, and is information expressing a certain incident by the expressions. In some cases, the incident information can include either the action expressions or the environment expressions. The incident information is, for example, text information explaining or reporting what abnormal action was performed in what environment, regarding an actually-happened abnormal circumstance. The incident information is, for example, a report describing a criminal action, or a news article regarding a criminal action. Specific examples of the incident information are provided below.

Incident Information 1: "A pupil was photographed by a suspicious-looking man in a car at an intersection in 2-chome toward evening.", and Incident Information 2: "Here is the news. An incident in which a man touched a woman's body occurred on a street around 4 p.m.".

The action expression extracting unit 120 extracts the action expressions from the incident information. The action expression extracting unit 120 extracts the action expressions using a known natural language processing technology, such as a morphological analysis, a syntax analysis, and a semantic analysis. For example, the action expression extracting unit 120 extracts the action expression "a man in a car takes a photograph" from Incident Information 1.

The environment expression extracting unit 130 extracts the environment expressions from the incident information. The environment expression extracting unit 130 extracts the environment expressions using a known natural language processing technology, such as a morphological analysis, a syntax analysis, and a semantic analysis. For example, the environment expression extracting unit 130 extracts the environment expressions "at an intersection in 2-chome" and "in the evening" from Incident Information 1.

The information collecting unit 140 associates the action expressions extracted by the action expression extracting unit 120 with the environment expressions expressing the environments when the actions expressed by the action expressions have been performed among the environment expressions extracted by the environment expression extracting unit 130, and stores the associated expressions in the first storing unit 210. The information collecting unit 140 determines whether or not a certain action expression and a certain environment expression are associated with each other using a known natural language processing technology, such as a morphological analysis, a syntax analysis, and a semantic analysis. The information collecting unit 140 may associate an action expression with such an environment expression extracted from the same incident information. The information collecting unit 140 may associate an action expression with such an environment expression extracted from the same sentence included in the incident information.

When the input receiving unit 110 receives the above-described Incident Information 1 and Incident Information 2, for example, the information collecting unit 140 associates the action expression "a man in a car takes a photograph" with the environment expression "at an intersection in 2-chome", and stores the associated expressions in the first storing unit 210. However, the information collecting unit 140 does not associate the action expression "a man touches a woman's body" with the environment expression "at an intersection in 2-chome". This is because the environment "at an intersection in 2-chome" is not an environment when the action "a man touches a woman's body" is performed.

The information collecting unit 140 conducts a search with respect to information obtained by associating action information with environment information, with the action expressions as a key, and calculates, on the basis of the search, frequency at which the environment expressions have been extracted. The information collecting unit 140 stores the calculated frequency in the first storing unit 210. The information collecting unit 140 may perform the processing of calculating the frequency after the above-described processing of associating the action expressions with the environment expressions. Alternatively, the information collecting unit 140 may execute the processing of calculating the frequency with reference to the first storing unit 210 depending on a processing request from the outputting unit 150 described below.

The first storing unit 210 associates the action expressions with the environment expressions expressing the environments when the actions expressed by the action expressions have been performed, and stores the associated expressions. The first storing unit 210 may further store the frequency at which the environment expressions have been extracted, which has been calculated by the information collecting unit 140. The frequency may be the number of times of extraction or the rate of the number of times of extraction.

The outputting unit 150 refers to the first storing unit 210, and compares the frequency at which the environment expressions associated with a specific action expression among the action expressions which the first storing unit 210 stores have been extracted with a predetermined threshold value. When the frequency at which the environment expressions have been extracted is higher than the predetermined threshold value, the outputting unit 150 associates the specific action expression with the environment expressions having high frequency of extraction and outputs the associated expressions.

FIG. 2 is a diagram illustrating an example of information which the first storing unit 210 illustrated in FIG. 1 stores. As illustrated in FIG. 2, the first storing unit 210 associates the action expression "a man in a car takes a photograph" with the environment expressions "about 10 a.m.", "in the evening", "at an intersection in 2-chome", and "in the Tokyo metropolitan area", and stores the associated expressions.

For each environment expression associated with the action expression "a man in a car takes a photograph", the first storing unit 210 illustrated in FIG. 2 stores the frequency at which the environment expression has been extracted. Referring to FIG. 2, for the action expression "a man in a car takes a photograph", the environment expression "about 10 a.m." has been extracted 1 time. The environment expression "in the evening" has been extracted 9 times. The environment expression "at an intersection in 2-chome" has been extracted 9 times. The environment expression "in the Tokyo metropolitan area" has been extracted 1 time. The first storing unit 210 may store the number of times the action expression has been extracted. Referring to FIG. 2, it is found that the action expression "a man in a car takes a photograph" has been extracted 10 times.

Figure 3:
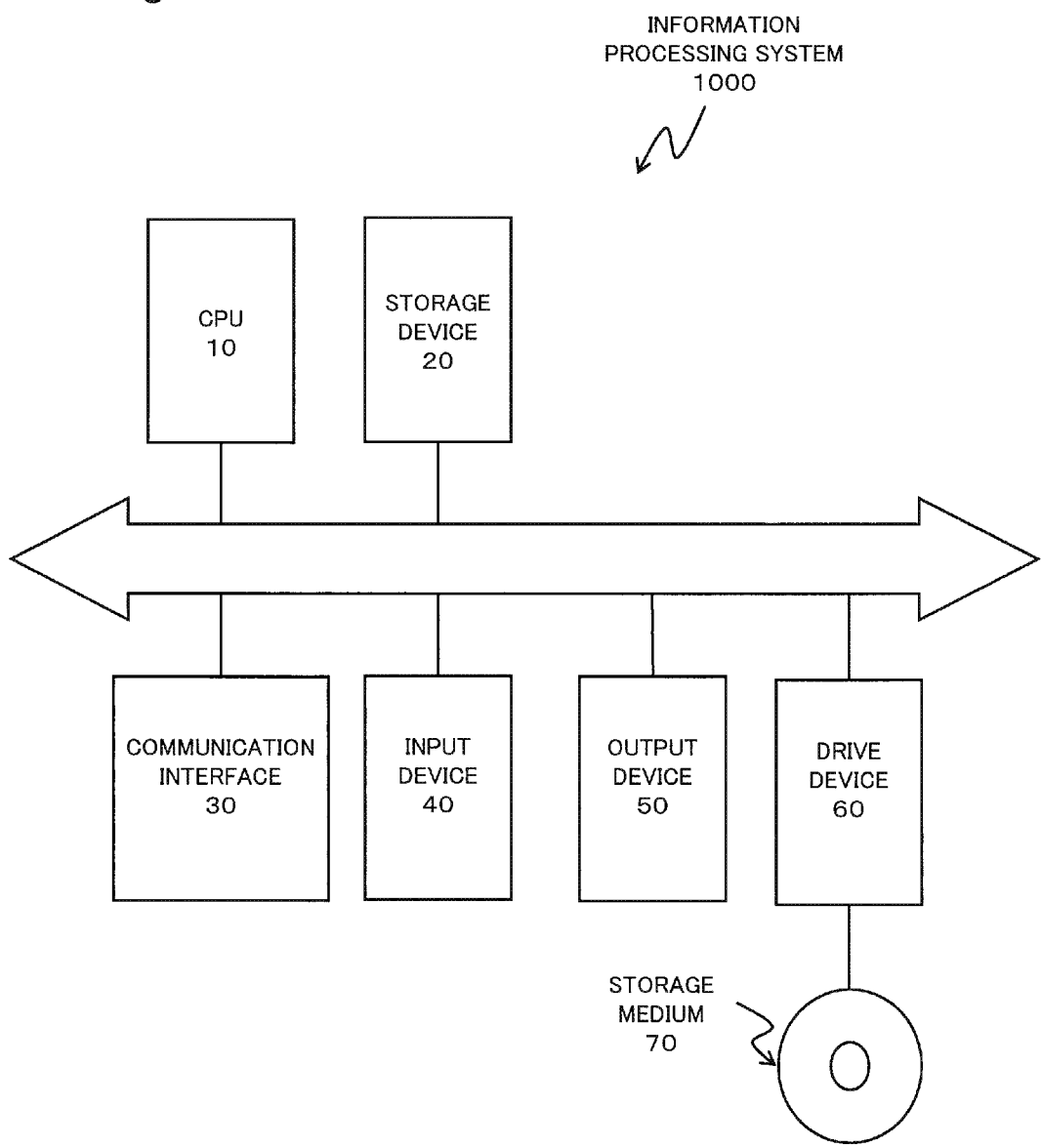
FIG. 3 is a diagram illustrating an example of a configuration of hardware capable of achieving the information processing system 1000 in the first exemplary embodiment of the present invention.

FIG. 3 is a diagram illustrating an example of a configuration of hardware of the information processing system 1000 illustrated in FIG. 1. As illustrated in FIG. 3, the information processing system 1000 includes a CPU (Central Processing Unit) 10, a storage device 20, a communication interface 30, an input device 40, and an output device 50.

For example, the CPU 10 executes a computer program (software program, hereinafter just referred to as "program") read by the storage device 20 so that the functions of the information processing system 1000 are achieved. In the execution, the CPU 10 arbitrarily controls the communication interface 30, the input device 40, and the output device 50.

For example, an application program controls the communication interface 30 using functions which an OS (Operating System) provides so that the communication which the information processing system 1000 executes is achieved. The input device 40 is, for example, a keyboard, a mouse, or a touch panel. The output device 50 is, for example, a display.

It is to be noted that the present invention described using the present exemplary embodiment and the respective exemplary embodiments described below as examples may be configured by a non-volatile storage medium 70, such as a compact disc storing such a program. The program stored in the storage medium 70 is read by a drive device 60, for example.

The information processing system 1000 may be configured by wired or wireless connection of two or more physically-separated devices.

Figure 4:
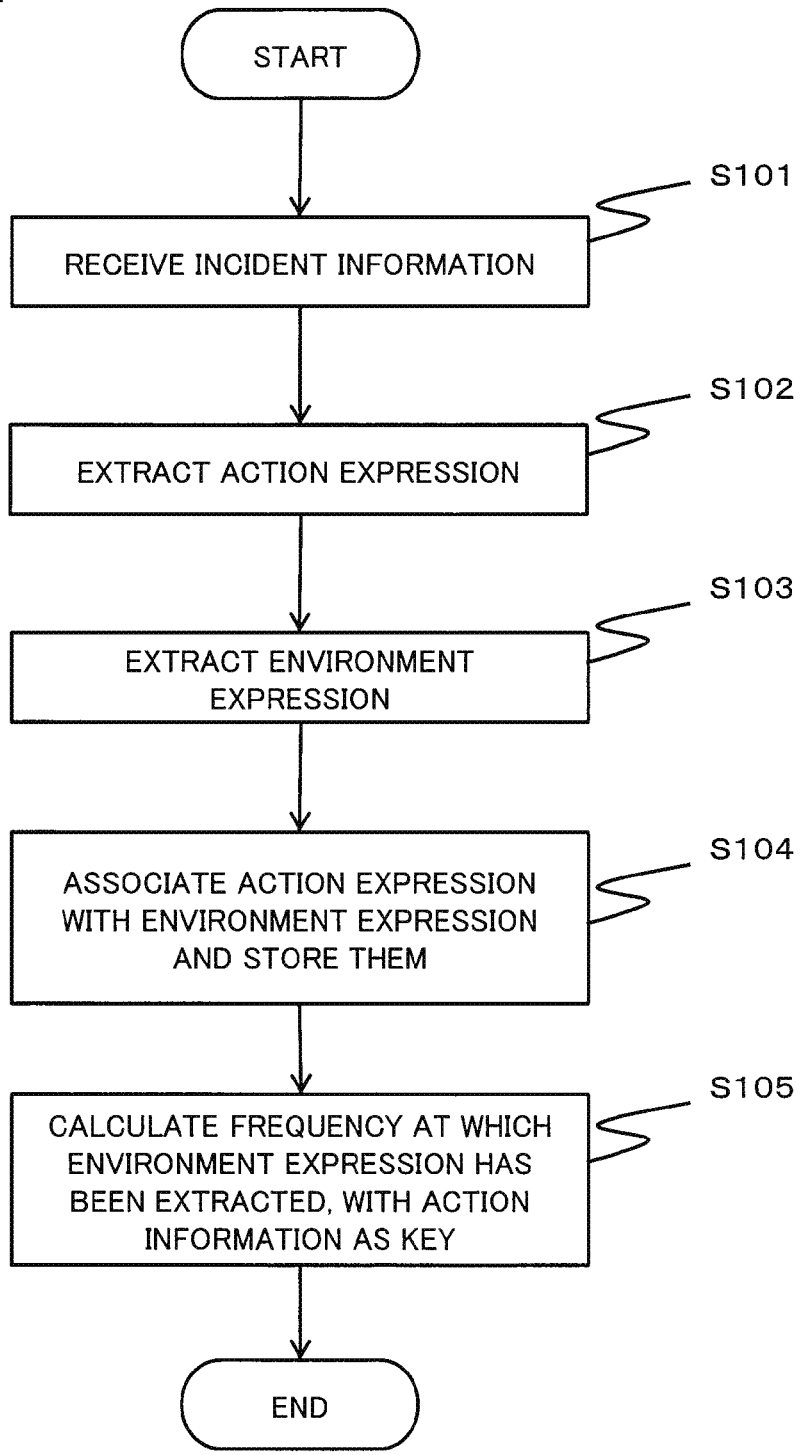
FIG. 4 is a flow chart illustrating an operation of the information processing system 1000 in the first exemplary embodiment of the present invention.

Next, an operation of the information processing system 1000 illustrated in FIG. 1 will be described using FIG. 4. FIG. 4 is a flow chart illustrating operations from when the input receiving unit 110 receives the input of a plurality of pieces of incident information till when the first storing unit 210 stores the action expressions and the environment expressions.

The input receiving unit 110 receives the input of a plurality of pieces of incident information (S101). The action expression extracting unit 120 extracts the action expressions from the incident information (S102). The environment expression extracting unit 130 extracts the environment expressions from the incident information (S103).

The information collecting unit 140 associates the action expressions with the environment expressions expressing the environments when the actions expressed by the action expressions have been performed, and stores the associated expressions in the first storing unit 210. The information collecting unit 140 conducts a search with respect to information obtained by associating action information with environment information, with the action expressions as a key, and calculates, on the basis of the search, the frequency at which the environment expressions have been extracted. The information collecting unit 140 stores the calculated frequency in the first storing unit 210 (S105). Regarding the operation of S105, the information collecting unit 140 may perform the operation of S105 after receiving a processing request from the outputting unit 150.

Figure 5:
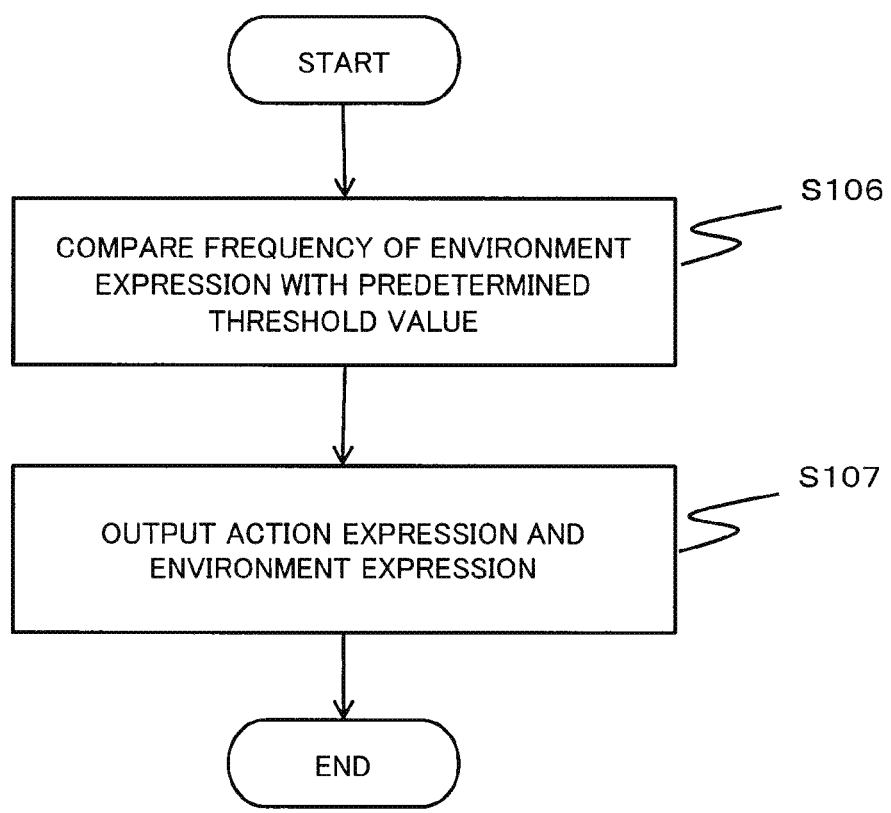
FIG. 5 is a flow chart illustrating the operation of the information processing system 1000 in the first exemplary embodiment of the present invention.

Subsequently, the operation of the information processing system 1000 illustrated in FIG. 1 will be described using FIG. 5. FIG. 5 is a flow chart illustrating operations in which the outputting unit 150 refers to the first storing unit 210, and outputs the environment expressions and the action expression.

The outputting unit 150 refers to the first storing unit 210, and compares the frequency at which the environment expressions have been extracted with a predetermined threshold value (S106). The outputting unit 160 outputs the environment expressions having frequency of extraction exceeding the predetermined threshold value and an action expression associated with the environment expressions (S107).

The outputting unit 160 may also output information indicating that the actions expressed by the action expressions are abnormal actions in the environments expressed by the environment expressions.

The effects of the information processing system 1000 according to the first exemplary embodiment will be described. The information processing system 1000 according to the first exemplary embodiment can output an action expression expressing an action which can be regarded as an abnormal circumstance, and an environment expression expressing an environment which can be regarded as an abnormal circumstance when detecting the action.

In addition, the information processing system 1000 according to the first exemplary embodiment can know in what environment the action which can be regarded as an abnormal circumstance tends to occur. The first reason is that the action expression extracting unit 120 and the environment expression extracting unit 130 distinguish the action expressions and the environment expressions, respectively, and extract them from the incident information. The second reason is that, for each environment expression associated with the action expression, the first storing unit 210 stores the frequency at which the environment expression has been extracted.

An operator of a monitoring system can use information which the information processing system 1000 outputs for work to set a monitoring rule. More specifically, the information processing system 1000 can support work of an operator to set a monitoring rule. This will be described in detail using two specific examples.

Specific Example 1

The first specific example will be described. The case where the incident information is a report describing a criminal action which occurred recently is assumed. For example, the case where the abnormal circumstance "a pupil was photographed by a suspicious-looking man in a car" occurs frequently in the evening at an intersection in 2-chome is assumed. In this case, it is thought that a lot of reports reporting what abnormal action was performed in what environment, regarding the abnormal circumstance, are prepared.

An operator inputs a plurality of pieces of incident information including a lot of reports regarding the abnormal circumstance, in the information processing system 1000. The action expression extracting unit 120 and the environment expression extracting unit 130 extract the action expression "a man in a car takes a photograph", and the environment expressions "in the evening" and "at an intersection in 2-chome" from a lot of incident information. The information collecting unit 140 associates the action expression "a man in a car takes a photograph" with the environment expressions "in the evening" and "at an intersection in 2-chome" and stores the associated expressions in the first storing unit 210. In this case, it is thought that the frequency at which the environment expression "in the evening" and the environment expression "at an intersection in 2-chome" have been extracted with respect to the action expression "a man in a car takes a photograph" is higher compared with the frequency at which other environment expressions are extracted.

The outputting unit 150 outputs the environment expressions having high frequency of extraction and the action expression associated with the environment expressions. More specifically, the outputting unit 150 outputs the action expression "a man in a car takes a photograph", and the environment expressions "in the evening" and "at an intersection in 2-chome". The operator of the monitoring system can use the information which the information processing system 1000 has outputted for setting a monitoring rule. In this case, setting of the following monitoring rule is appropriate for preventing the incident. Monitoring Rule: "if (in the evening) and (at an intersection in 2-chome) and (a man in a car takes a photograph) then (issue a warning)".

In this manner, the information processing system 1000 according to the first exemplary embodiment can extract characteristics in which what abnormal action was performed in what environment regarding an actually-happened abnormal circumstance. Therefore, by confirming the information which the information processing system 1000 according to the first exemplary embodiment outputs, the operator of the monitoring system can set an appropriate monitoring rule depending on an environment to be monitored even without knowledge about the characteristics of the abnormal circumstance.

Specific Example 2

The second specific example will be described. The case where the incident information is a news article regarding a criminal action is assumed. In this case, it is thought that, for example, the number of pieces of incident information describing a usual state, such as "a man holds a knife in a kitchen", is small. This is because a usual state is difficult to become a news article regarding a criminal action. On the other hand, it is thought that the number of pieces of incident information describing an abnormal circumstance, such as "a man holds a knife at an airport", is large.

In this case, it is thought that the frequency at which the environment expression "at an airport" has been extracted with respect to the action expression "a man holds a knife" is higher than the frequency at which the environment expression "in a kitchen" has been extracted. The outputting unit 150 outputs "at an airport" which is an environment expression having high frequency of extraction and "a man holds a knife" which is an action expression associated with the environment expression. In this manner, when a certain action has been detected, the information processing system 1000 can output an environment expression expressing an environment in which the action is determined to be an abnormal circumstance.

Therefore, by confirming the information which the information processing system 1000 according to the first exemplary embodiment outputs, the operator of the monitoring system can set an appropriate monitoring rule even without knowledge about the environment to be monitored.

Heretofore, the example using the report describing a criminal action as the incident information and the example using the news article regarding a criminal action as the incident information have been described. The information processing system 1000 can output an action expression expressing an action which can be regarded as an abnormal circumstance, and an environment expression expressing an environment which can be regarded as an abnormal circumstance when detecting the action. By using the information outputted from the information processing system 1000 for setting a monitoring rule, the operator of the monitoring system can save the trouble of setting a monitoring rule.

Modified Examples of First Exemplary Embodiment

When extracting the environment expression, the environment expression extracting unit 130 may use an expression which becomes a clue for extracting the environment expression. The environment expression extracting unit 130 may extract, for example, a clause described before a character string, such as "during" and "when", as an environment expression expressing time. The environment expression extracting unit 130 may extract, for example, a clause described before a character string, such as "on" and "at", as an environment expression expressing a place. The environment expression extracting unit 130 may extract, for example, a clause described before a character string, such as "in an atmosphere where", as an environment expression expressing an atmosphere.

Either the action expression extracting unit 120 or the environment expression extracting unit 130 may operate first.

The action expression extracting unit 120 and the environment expression extracting unit 130 may operate as follows, for example. The operations of the action expression extracting unit 120 and the environment expression extracting unit 130 will be described using the case where the input receiving unit 110 receives the following pieces of incident information, as an example.

Incident Information 3: At an intersection in front of an elementary school, when a pupil looked both ways, a silver car stopped, and the pupil was photographed by a man in the car from the inside of the car, and Incident Information 4: On March 5, Tuesday, around 0:30 p.m., on a street, when a student went home, a student's body was touched by a man wearing a sunglass.

The environment expression extracting unit 130 extracts from Incident Information 3 and Incident Information 4 the following environment expressions "when a pupil looked both ways", "at an intersection in front of an elementary school", "on March 5, Tuesday, around 0:30 p.m.", "on a street", and "when a student went home".

The action expression extracting unit 120 may not extract an action expression from a clause including an environment expression. The action expression extracting unit 120 may extract an action expression from a clause including an environment expression when the environment expression is an indispensable case of the action expression. By removing a clause including an environment expression from Incident Information 3 and Incident Information 4 (however, a clause in which an environment expression is an indispensable case of an action expression is left), the following parts are left.

Incident Information 3: A silver car stopped, and a pupil was photographed by a man in the car from the inside of the car, and Incident Information 4: A student's body was touched by a man wearing a sunglass.

The action expression extracting unit 120 extracts action expressions from these expressions.

Action Expressions extracted from Incident Information 3: a silver car stops, a man in the car takes a photograph, and Action Expression extracted from Incident Information 4: a man wearing a sunglass touches a student's body.

The action expression extracting unit 120 may unify the extracted action expressions into either the passive voice or the active voice. In the above-described example, the action expression extracting unit 120 unifies the extracted action expressions into the active voice.

The first storing unit 210 may not store the frequency at which an action expression or an environment expression has been extracted. For example, the first storing unit 210 may additionally store a new record every time the first storing unit 210 stores the action expression or the environment expression. In this case, the information collecting unit 140 may receive a processing request from the outputting unit 150, refer to the first storing unit 210, and calculate the frequency at which the environment expression has been extracted, on the basis of the number of records.

The outputting unit 150 may output only an action expression which has been extracted at frequency higher than a predetermined threshold value. By having such a configuration, even when little noise is mixed in the incident information, the outputting unit 150 can output information from which the noise is removed.

Second Exemplary Embodiment

Figure 6:
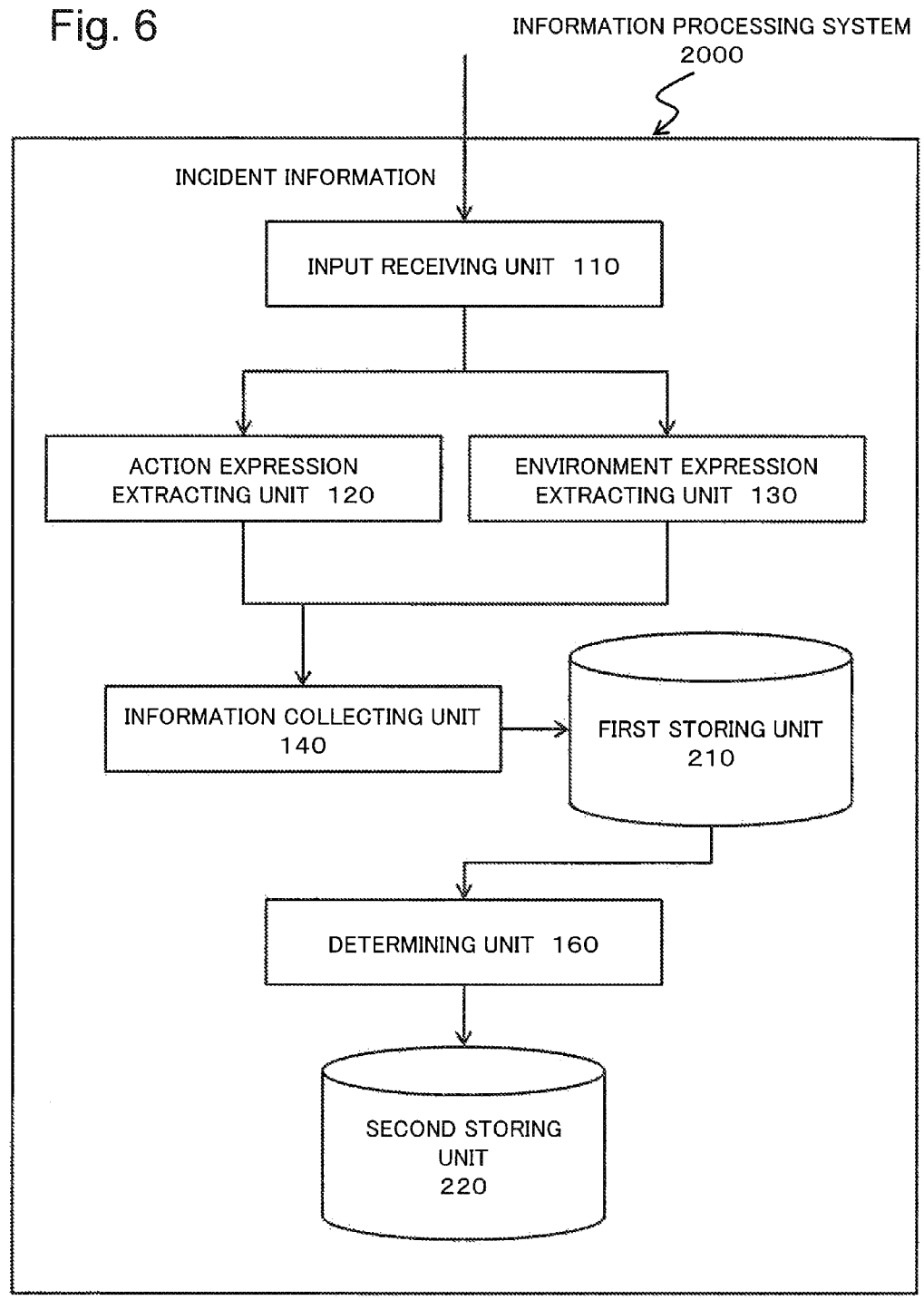
FIG. 6 is a block diagram illustrating a configuration of an information processing system 2000 in a second exemplary embodiment of the present invention.

FIG. 6 is a block diagram illustrating a configuration of an information processing system 2000 according to a second exemplary embodiment. Since the same reference numeral is applied to a configuration which is substantially the same as the configuration illustrated in FIG. 1, the explanation is omitted. As illustrated in FIG. 6, the information processing system 2000 according to the second exemplary embodiment includes a determining unit 160 in place of the outputting unit 150, and further includes a second storing unit 220.

The determining unit 160 refers to the first storing unit 210, and compares frequency at which the environment expressions associated with a specific action expression among the action expressions which the first storing unit 210 stores have been extracted with a predetermined threshold value. When the frequency at which the environment expressions have been extracted is higher than the predetermined threshold value, the outputting unit 150 associates the specific action expression with the environment expressions having high frequency of extraction and stores the associated expressions in the second storing unit 220.

The second storing unit 220 associates the environment expressions having frequency higher than the predetermined threshold value with the action expression associated with the environment expressions and stores the associated expressions.

Figure 7:
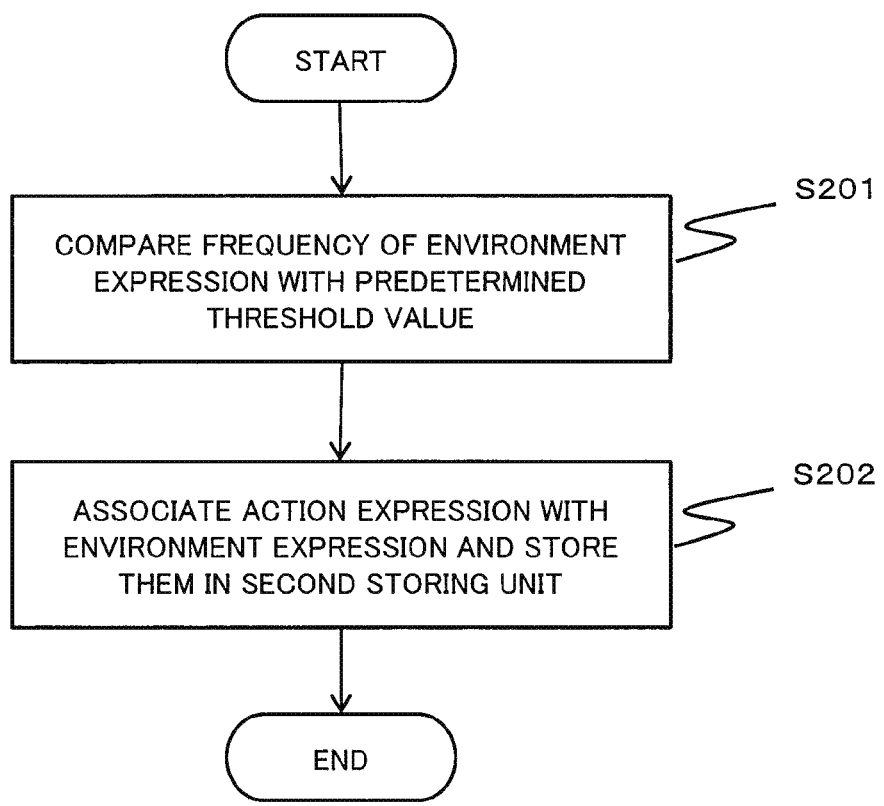
FIG. 7 is a flow chart illustrating an operation of the information processing system 2000 in the second exemplary embodiment of the present invention.

An operation of the information processing system 2000 illustrated in FIG. 6 will be described using FIG. 7. Since the operations from S101 to S105 are the same as the first exemplary embodiment, the explanation in the present exemplary embodiment is omitted.

The determining unit 160 refers to the first storing unit 210, and compares the frequency at which the environment expressions have been extracted with the predetermined threshold value (S201). The determining unit 160 extracts the environment expressions having frequency higher than the predetermined threshold value and the action expression associated with the environment expressions, and stores the extracted result in the second storing unit 220 (S202).

FIG. 8 is a diagram illustrating an example of information which the second storing unit 220 stores. The information illustrated in FIG. 8 is information obtained by extracting the environment expressions having frequency of extraction of 5 or more from the information illustrated in FIG. 2, which the first storing unit 210 stores.

The operator of the monitoring system can use the information stored in the second storing unit 220 for setting a monitoring rule. More specifically, the information processing system 2000 according to the second exemplary embodiment can support work of an operator to set a monitoring rule.

Third Exemplary Embodiment

Figure 9:
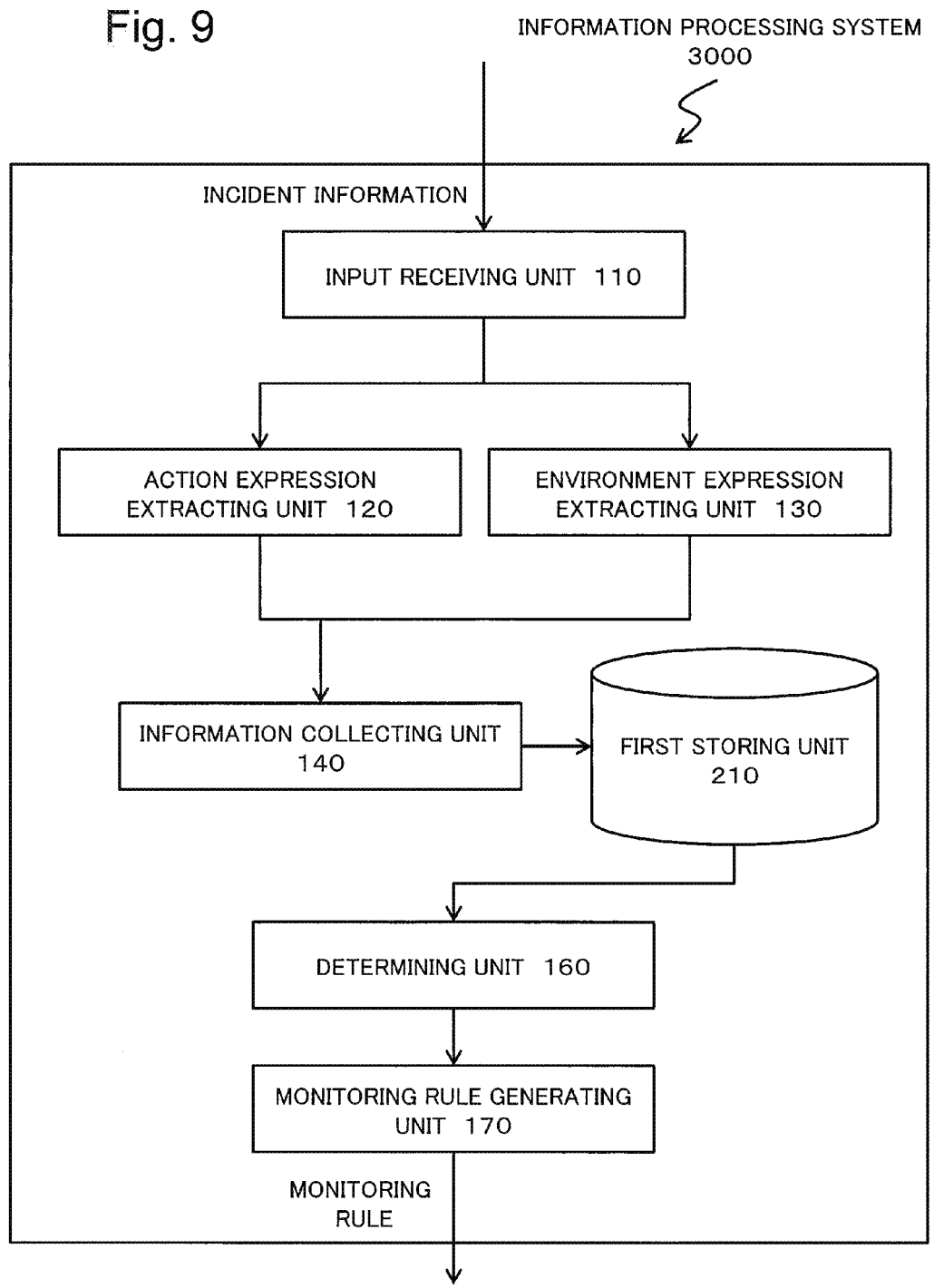
FIG. 9 is a block diagram illustrating a configuration of an information processing system 3000 in a third exemplary embodiment of the present invention.

FIG. 9 is a block diagram illustrating a configuration of an information processing system 3000 according to a third exemplary embodiment. Since the same reference numeral is applied to a configuration which is substantially the same as the configuration illustrated in FIG. 1, the explanation is omitted. As illustrated in FIG. 9, the information processing system 3000 according to the third exemplary embodiment includes a monitoring rule generating unit 170.

The monitoring rule generating unit 170 receives the environment expressions which have been extracted at frequency higher than the predetermined threshold value and the action expression associated with the environment expressions from the determining unit 160. The monitoring rule generating unit 170 generates a monitoring rule, based on the environment expressions and the action expression received from the determining unit 160. The monitoring rule generating unit 170 generates a monitoring rule having a conditional clause in which the environments expressed by the environment expressions are satisfied and the action expressed by the action expression is detected.

This will be described using a specific example. The monitoring rule generating unit 170 receives, for example, the action expression "a man holds a knife" and the environment expression "at an airport" from the determining unit 160. The monitoring rule generating unit 170 generates the following monitoring rule, based on the received environment expression and action expression. Monitoring Rule: "if (a man holds a knife) and (at an airport) then (issue a warning)".

The information processing system 3000 according to the third exemplary embodiment can automatically generate a monitoring rule. More specifically, according to the information processing system 3000 according to the third exemplary embodiment, the operator can save the trouble of setting a monitoring rule.

Fourth Exemplary Embodiment

Figure 10:
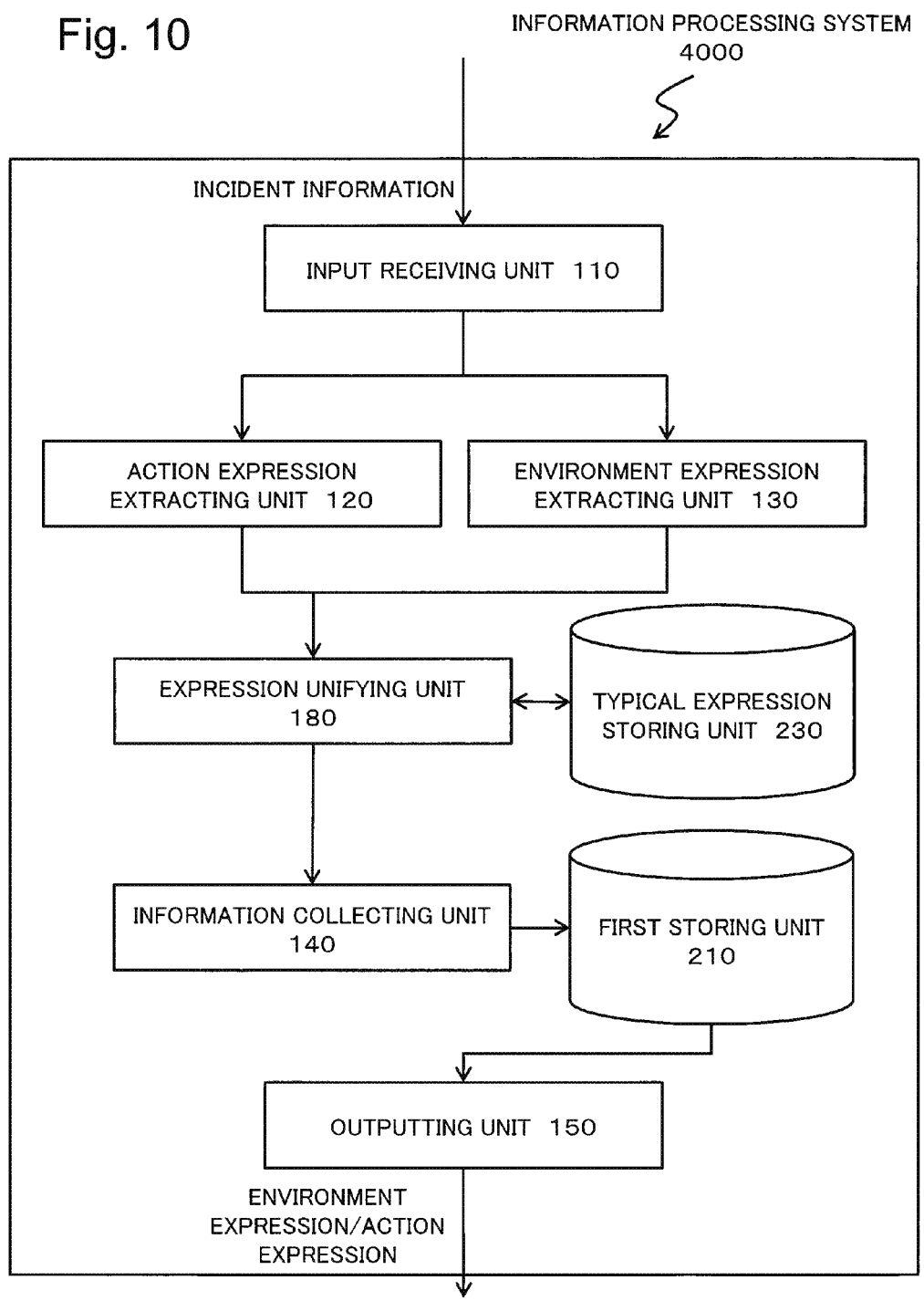
FIG. 10 is a block diagram illustrating a configuration of an information processing system 4000 in a fourth exemplary embodiment of the present invention.

FIG. 10 is a block diagram illustrating a configuration of an information processing system 4000 according to a fourth exemplary embodiment. Since the same reference numeral is applied to a configuration which is substantially the same as the configuration illustrated in FIG. 1, the explanation is omitted. As illustrated in FIG. 10, the information processing system 4000 according to the fourth exemplary embodiment includes a typical expression storing unit 230 and an expression unifying unit 180.

The typical expression storing unit 230 stores synonymous expressions and convertible expressions of an action expressed by an action expression and an environment expressed by an environment expression. The typical expression storing unit 230 stores one typical expression which is a typical expression with respect to a lot of synonymous expressions and convertible expressions. For example, as the synonymous expressions and the convertible expressions of the expression "a person shouts loudly", there are expressions, such as "a person speaks loudly", "a person screams", and "an audience shouts loudly". The typical expression storing unit 230 stores the expression "a person shouts loudly", for example, as a typical expression thereof.

The expression unifying unit 180 receives the action expressions and the environment expressions which the action expression extracting unit 120 and the environment expression extracting unit 130 have extracted, and refers to the typical expression storing unit 230 to replace them with typical expressions which the typical expression storing unit 230 stores.

Figure 11:
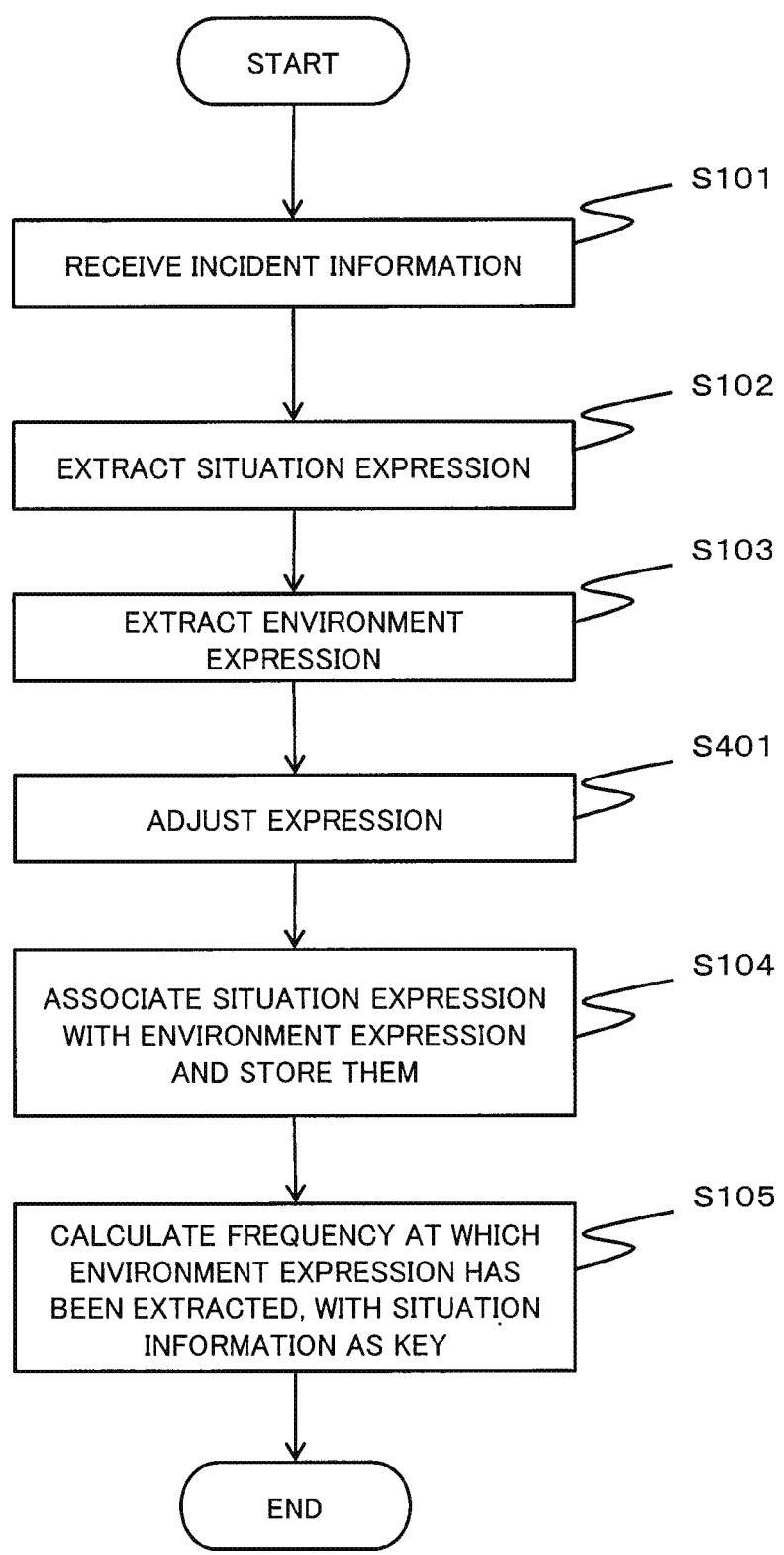
FIG. 11 is a flow chart illustrating an operation of the information processing system 4000 in the fourth exemplary embodiment of the present invention.

An operation of the information processing system 4000 illustrated in FIG. 10 will be described using FIG. 11. The same reference numeral is applied to a step which is substantially the same as the first exemplary embodiment, and the explanation is omitted.

The expression unifying unit 180 receives the action expressions and the environment expressions which the action expression extracting unit 120 and the environment expression extracting unit 130 have extracted, and refers to the typical expression storing unit 230 to replace them with typical expressions which the typical expression storing unit 230 stores (S401).

According to the information processing system 4000 according to the fourth exemplary embodiment, even if there is fluctuation of description in the extracted action expressions and environment expressions, the frequency at which the action expressions and the environment expressions have been extracted can be calculated more accurately.

It is to be noted that the information which the typical expression storing unit 230 stores may be generated by hand. The information which the typical expression storing unit 230 stores may be generated by using related arts which the following (Reference 1) and (Reference 2) disclose.
(Reference 1) Synonym Extraction Using Web Search Query Logs and Click-through Logs, Kei Uchiumi and Mamoru Komachi, Transaction of Information Proceeding Society of Japan, Database Vol. 6, No. 1, pp. 16-28, Publication Date: Jan. 23, 2013, and
(Reference 2) Hacking Wikipedia for Hyponymy Relation Acquisition Asuka Sumida and Kentaro Torisawa in Proceedings of IJCNLP-08, pp. 883-888, 2008

Fifth Exemplary Embodiment

Figure 12:
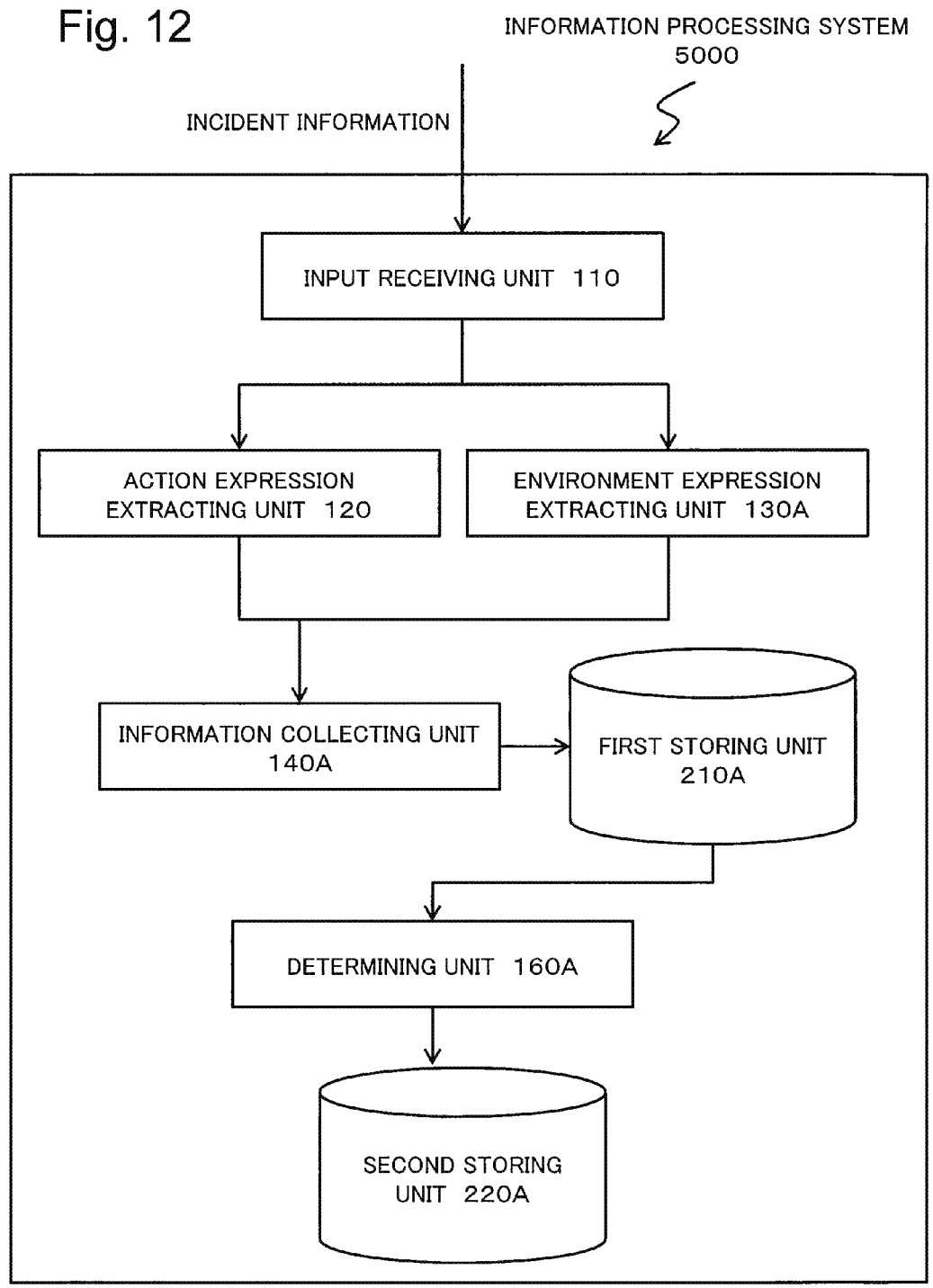
FIG. 12 is a block diagram illustrating a configuration of an information processing system 5000 in a fifth exemplary embodiment of the present invention.

FIG. 12 is a block diagram illustrating a configuration of an information processing system 5000 according to a fifth exemplary embodiment. Since the same reference numeral is applied to a configuration which is substantially the same as the configuration illustrated in FIG. 9, the explanation is omitted. The information processing system 5000 according to the fifth exemplary embodiment includes an environment expression extracting unit 130A in place of the environment expression extracting unit 130, an information collecting unit 140A in place of the information collecting unit 140, a first storing unit 210A in place of the first storing unit 210, a determining unit 160A in place of the determining unit 160, and a second storing unit 220A in place of the second storing unit 220.

The environment expression extracting unit 130A extracts the environment expressions from the incident information. At this time, the environment expression extracting unit 130A separately extracts environment expressions regarding time (hereinafter, referred to as time expressions) and environment expressions regarding a place (hereinafter, referred to as place expressions).

The information collecting unit 140A associates the action expressions extracted by the action expression extracting unit 120 with the time expressions expressing the time when the actions expressed by the action expressions have been performed among the time expressions extracted by the environment expression extracting unit 130A, and stores the associated expressions in the first storing unit 210A. The information collecting unit 140A associates the action expressions extracted by the action expression extracting unit 120 with the place expressions expressing places when the actions expressed by the action expressions have been performed among the place expressions extracted by the environment expression extracting unit 130A, and stores the associated expressions in the first storing unit 210A.

The information collecting unit 140A conducts a search with respect to information obtained by associating action information with environment information, with the action expressions as a key, and calculates, on the basis of the search, frequency at which the environment expressions have been extracted. The information collecting unit 140A stores the calculated frequency in the first storing unit 210A.

The first storing unit 210A associates the action expressions with the time expressions expressing time when the actions expressed by the action expressions have been performed, and stores the associated expressions. The first storing unit 210A associates the action expressions with the place expressions expressing places when the actions expressed by the action expressions have been performed, and stores the associated expressions.

FIG. 13 is a diagram illustrating an example of information which the first storing unit 210A illustrated in FIG. 12 stores. As illustrated in FIG. 13, the first storing unit 210A associates the action expression "a man in a car takes a photograph" with the time expressions "about 10 a.m." and "in the evening", and stores the associated expressions. In addition, the first storing unit 210A associates the action expression "a man in a car takes a photograph" with the place expressions "at an intersection in 2-chome" and "in the Tokyo metropolitan area", and stores the associated expressions.

Reverting to the description referring to FIG. 12, the determining unit 160A refers to the first storing unit 210, and compares the frequency at which the environment expressions associated with a specific action expression among the action expressions which the first storing unit 210 stores have been extracted with a predetermined threshold value. When the frequency at which the environment expressions have been extracted is higher than the predetermined threshold value, the determining unit 160A associates the specific action expression with the environment expressions having high frequency of extraction and stores the associated expressions in the second storing unit 220A.

FIG. 14 is a diagram illustrating an example of information which the second storing unit 220A stores. The information illustrated in FIG. 14 is information obtained by extracting the environment expressions having frequency of extraction of 5 or more from the information illustrated in FIG. 13, which the first storing unit 210A stores.

According to the information processing system 5000 according to the fifth exemplary embodiment, work of an operator to generate a monitoring rule including both a time expression and a place expression can be supported.

Sixth Exemplary Embodiment

Figure 15:
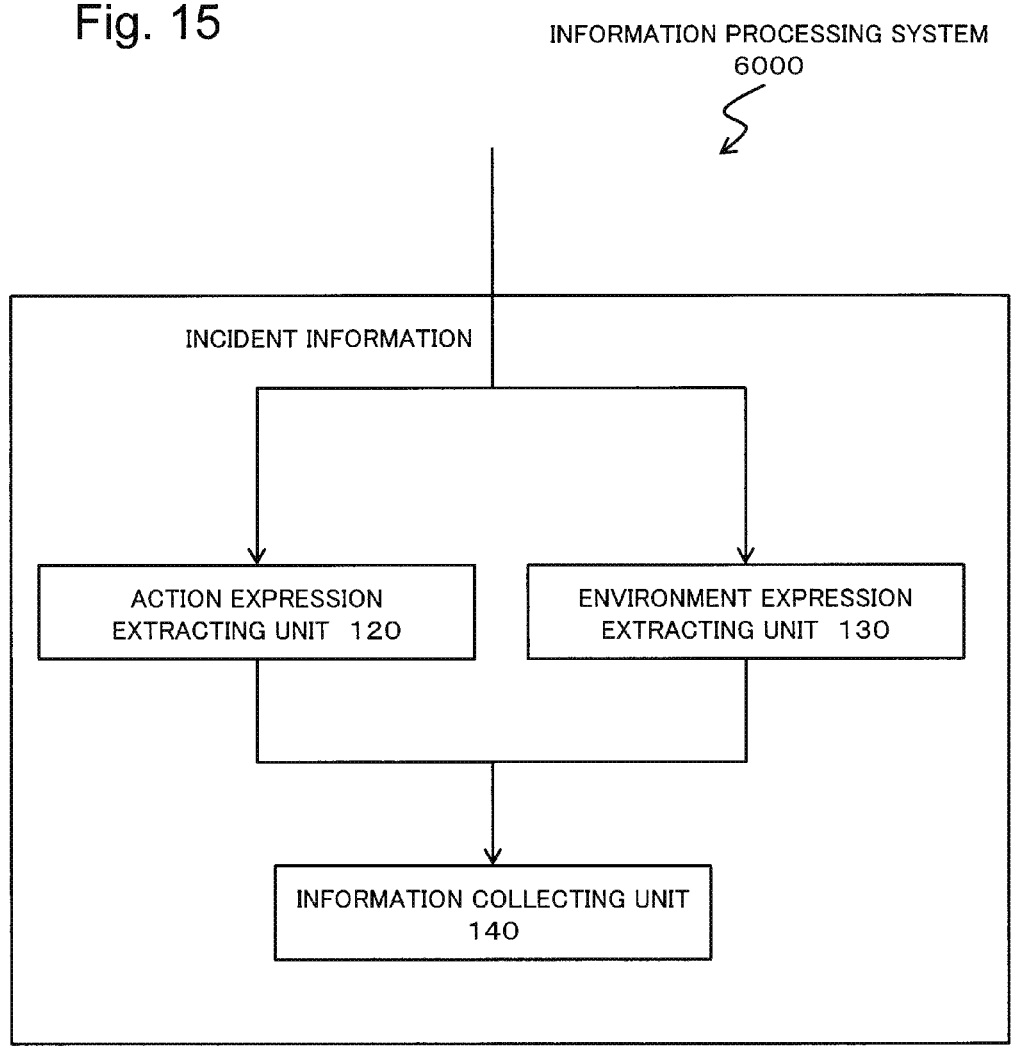
FIG. 15 is a block diagram illustrating a configuration of an information processing system 6000 in a sixth exemplary embodiment of the present invention.

FIG. 15 is a block diagram illustrating a configuration of an information processing system 6000 according to a fifth exemplary embodiment. Since the same reference numeral is applied to a configuration which is substantially the same as the configuration illustrated in FIG. 1, the explanation is omitted.

The environment expression extracting unit 130 extracts environment expressions from incident information, which includes the environment expressions which are expressions expressing environments to be monitored and action expressions which are expressions expressing actions performed in the environments, and is information expressing a certain incident by the expressions. The action expression extracting unit 120 extracts the action expressions from the incident information.

The information collecting unit 140 generates information in which the extracted action expressions are associated with the environment expressions expressing the environments when the actions expressed by the action expressions have been performed among the extracted environment expressions. The information collecting unit 140 conducts a search with respect to the generated information, with the action expressions as a key, and calculates, on the basis of the search, frequency at which the environment expressions have been extracted.

Heretofore, the exemplary embodiments of the present invention have been described, but the above-descried exemplary embodiments are those for the purpose of easy understanding of the present invention, not for limitedly interpreting the present invention. The present invention can be changed and modified without departing from the scope thereof, and equivalents thereof are included in the present invention.

This application claims priority to Japanese Patent Application No. 2013-090534 filed on Apr. 23, 2013, the entire contents of which are incorporated herein.

INDUSTRIAL APPLICABILITY

The present invention can be used for supporting work of an operator of a monitoring system to set a monitoring rule.

REFERENCE SIGNS LIST

1000 INFORMATION PROCESSING SYSTEM
2000 INFORMATION PROCESSING SYSTEM
3000 INFORMATION PROCESSING SYSTEM
4000 INFORMATION PROCESSING SYSTEM
5000 INFORMATION PROCESSING SYSTEM
6000 INFORMATION PROCESSING SYSTEM
10 CPU
20 STORAGE DEVICE
30 COMMUNICATION INTERFACE
40 INPUT DEVICE
50 OUTPUT DEVICE
60 DRIVE DEVICE
70 STORAGE MEDIUM
110 INPUT RECEIVING UNIT
120 ACTION EXPRESSION EXTRACTING UNIT
130 ENVIRONMENT EXPRESSION EXTRACTING UNIT
130A ENVIRONMENT EXPRESSION EXTRACTING UNIT
140 INFORMATION COLLECTING UNIT
140A INFORMATION COLLECTING UNIT
150 OUTPUTTING UNIT
160 DETERMINING UNIT
160A DETERMINING UNIT
170 MONITORING RULE GENERATING UNIT
180 EXPRESSION UNIFYING UNIT

210 FIRST STORING UNIT
210A FIRST STORING UNIT
220 SECOND STORING UNIT
220A SECOND STORING UNIT
230 TYPICAL EXPRESSION STORING UNIT

What is claimed is:

1. An information processing system comprising circuitry configured to:
   extract environment expressions from incident information, which describes an incident in which what abnormal action was performed in what environment, and which includes
      the environment expressions expressing the environments to be monitored and
      action expressions expressing actions performed in the environments;
   extract the action expressions from the incident information;
   generate information in which the extracted action expressions are associated with the environment expressions expressing the environments when the actions expressed by the action expressions have been performed among the extracted environment expressions, conducts a search with respect to the generated information, with the action expressions as a key, and calculates, on the basis of the search, frequency at which the environment expressions have been extracted;
   store the action expressions and the associated environment;
   refer to the stored expressions, and, when the frequency at which the environment expressions associated with a specific action expression among the stored action expressions have been extracted is higher than a predetermined threshold value, associates the specific action expression with the environment expressions having high frequency of extraction and outputs the associated expressions; and
   generate a monitoring rule for monitoring occurrence of an abnormal circumstance, on the basis of the outputted environment expressions and action expression, the monitoring rule having a conditional clause in which the environments expressed by the environment expressions are satisfied and the action expressed by the action expression is detected.

2. The information processing system according to claim 1, the circuitry further configured to
   in the outputting, output information indicating that the actions expressed by the action expressions are abnormal actions in the environments expressed by the environment expressions.

3. The information processing system according claim 1, the circuitry further configured to
   associate an action expression with an environment expression extracted from the same incident information.

4. The information processing system according to claim 2, the circuitry further configured to
   associate an action expression with an environment expression extracted from the same incident information.

5. The information processing system according to claim 1, the circuitry further configured to
   associate an action expression with an environment expression extracted from the same sentence included in the incident information.

6. The information processing system according to claim 2, the circuitry further configured to
   associate an action expression with an environment expression extracted from the same sentence included in the incident information.

7. The information processing system according to claim 3, the circuitry further configured to
   associate an action expression with an environment expression extracted from the same sentence included in the incident information.

8. The information processing system according to claim 1, the circuitry further configured to
   for an action expression having frequency of extraction exceeding a predetermined threshold value, in the outputting, output the action expression and an environment expression associated with the action expression.

9. The information processing system according to claim 2, the circuitry further configured to
   for an action expression having frequency of extraction exceeding a predetermined threshold value, in the outputting, output the action expression and an environment expression associated with the action expression.

10. The information processing system according to claim 3, the circuitry further configured to
    for an action expression having frequency of extraction exceeding a predetermined threshold value, in the outputting, output the action expression and an environment expression associated with the action expression.

11. The information processing system according to claim 4, the circuitry further configured to
    for an action expression having frequency of extraction exceeding a predetermined threshold value, in the outputting, output the action expression and an environment expression associated with the action expression.

12. The information processing system according to claim 1, the circuitry further configured to
    associate a plurality of expressions expressing the same or similar actions or environments with a typical expression which is a typical expression of the plurality of expressions, and stores the associated expressions; and
    refer to the stored typical expression, on the basis of the environment expressions or the action expressions, to replace the environment expressions or the action expressions with the typical expression.

13. The information processing system according to claim 2, the circuitry further configured to
    associate a plurality of expressions expressing the same or similar actions or environments with a typical expression which is a typical expression of the plurality of expressions, and stores the associated expressions; and
    refer to the stored typical expression, on the basis of the environment expressions or the action expressions, to replace the environment expressions or the action expressions with the typical expression.

14. The information processing system according to claim 3, the circuitry further configured to
    associate a plurality of expressions expressing the same or similar actions or environments with a typical expression which is a typical expression of the plurality of expressions, and stores the associated expressions; and
    refer to the stored typical expression, on the basis of the environment expressions or the action expressions, to replace the environment expressions or the action expressions with the typical expression.

15. The information processing system according to claim 4, the circuitry further configured to associate a plurality of expressions expressing the same or similar actions or environments with a typical expression which is a typical expression of the plurality of expressions, and stores the associated expressions; and refer to the stored typical expression, on the basis of the environment expressions or the action expressions, to replace the environment expressions or the action expressions with the typical expression.

16. The information processing system according to claim 5, the circuitry further configured to associate a plurality of expressions expressing the same or similar actions or environments with a typical expression which is a typical expression of the plurality of expressions, and stores the associated expressions; and refer to the stored typical expression, on the basis of the environment expressions or the action expressions, to replace the environment expressions or the action expressions with the typical expression.

17. An information processing method executed by a computer, comprising processes of:

extracting environment expressions from incident information, which describes an incident in which what abnormal action was performed in what environment, and which includes the environment expressions expressing the environments to be monitored and action expressions expressing actions performed in the environments;

extracting the action expressions from the incident information;

generating information in which the extracted action expressions are associated with the environment expressions expressing the environments when the actions expressed by the action expressions have been performed among the extracted environment expressions, conducts a search with respect to the generated information, with the action expressions as a key, and calculates, on the basis of the search, frequency at which the environment expressions have been extracted;

storing the action expressions and the associated environment expressions;

referring to the stored expressions, and, when the frequency at which the environment expressions associated with a specific action expression among the stored action expressions have been extracted is higher than a predetermined threshold value, associates the specific action expression with the environment expressions having high frequency of extraction and outputs the associated expressions; and generating a monitoring rule for monitoring occurrence of an abnormal circumstance, on the basis of the outputted environment expressions and action expression, the monitoring rule having a conditional clause in which the environments expressed by the environment expressions are satisfied and the action expressed by the action expression is detected.

18. A non-transitory computer-readable storage medium storing a program which causes a computer to execute processing for:

extracting environment expressions from incident information, which describes an incident in which what abnormal action was performed in what environment, and which includes the environment expressions expressing the environments to be monitored and action expressions expressing actions performed in the environments;

extracting the action expressions from the incident information;

generating information in which the extracted action expressions are associated with the environment expressions expressing the environments when the actions expressed by the action expressions have been performed among the extracted environment expressions, conducts a search with respect to the generated information, with the action expressions as a key, and calculates, on the basis of the search, frequency at which the environment expressions have been extracted;

storing the action expressions and the associated environment expressions;

referring to the stored expressions, and, when the frequency at which the environment expressions associated with a specific action expression among the stored action expressions have been extracted is higher than a predetermined threshold value, associates the specific action expression with the environment expressions having high frequency of extraction and outputs the associated expressions; and generating a monitoring rule for monitoring occurrence of an abnormal circumstance, on the basis of the outputted environment expressions and action expression, the monitoring rule having a conditional clause in which the environments expressed by the environment expressions are satisfied and the action expressed by the action expression is detected.

* * * * *